US007567857B2

(12) United States Patent
Laugwitz

(10) Patent No.: US 7,567,857 B2
(45) Date of Patent: Jul. 28, 2009

(54) CONTROL DEVICE AND METHOD FOR A VIBRATORY MACHINE

(75) Inventor: Niels Laugwitz, Koblenz (DE)

(73) Assignee: BOMAG GmbH, Boppard (DE)

( * ) Notice: Subject to any disclaimer, the term of this patent is extended or adjusted under 35 U.S.C. 154(b) by 843 days.

(21) Appl. No.: 11/064,849

(22) Filed: Feb. 25, 2005

(65) Prior Publication Data

US 2005/0193843 A1 Sep. 8, 2005

(30) Foreign Application Priority Data

Feb. 29, 2004 (DE) ...................... 10 2004 009 841
Mar. 30, 2004 (DE) ...................... 10 2004 015 589

(51) Int. Cl.
*G06F 15/20* (2006.01)

(52) U.S. Cl. ........................ 700/280; 701/50; 180/65.3; 68/24

(58) Field of Classification Search ................... 700/90, 700/275, 280; 68/24; 701/50; 180/65.3
See application file for complete search history.

(56) References Cited

U.S. PATENT DOCUMENTS 4,617,637 A * 10/1986 Chu et al. ................... 700/275
6,230,091 B1 * 5/2001 McQuinn ..................... 701/50
6,533,054 B1 * 3/2003 Fey ........................... 180/65.3
6,539,753 B1 * 4/2003 Ito et al. ....................... 68/3 R
2004/0168485 A1 * 9/2004 Lim ............................. 68/24

FOREIGN PATENT DOCUMENTS

DE 199 12 813 C1 3/1999
DE 699 00 009 T2 4/1999
DE 200 19 823 U1 11/2000
DE 101 21 383 C2 5/2001

* cited by examiner

*Primary Examiner*—Albert DeCady
*Assistant Examiner*—Douglas S Lee
(74) *Attorney, Agent, or Firm*—Baker & Hostetler LLP

(57) ABSTRACT

This invention relates to a control unit for an unbalanced mass adjusting device in a vibration generator, in particular in a soil compaction machine, having an adjusting cylinder which is hydraulically adjustable to adjust a relative position of contrarotating unbalanced masses in the vibration generator, having a control valve to adjust the adjusting cylinder so that the vibration behavior of the vibration generator is adjusted and having a control unit for triggering the control valve according to a pulse width modulation signal to adjust the relative position of the unbalanced masses as a function of the pulse duty factor of the pulse width modulation signal.

10 Claims, 3 Drawing Sheets

CONTROL DEVICE AND METHOD FOR A VIBRATORY MACHINE

CROSS REFERENCE TO RELATED APPLICATIONS

This application claims priority to German Patent Application Serial No. 102004009841.7, filed Feb. 29, 2004 and German Patent Application Serial No. 102004015589.5 filed Mar. 30, 2004 titled, CONTROL DEVICE AND METHOD FOR A VIBRATORY MACHINE, the disclosure of which is incorporated by reference in its entirety.

FIELD OF THE INVENTION

This invention relates to a control unit for an unbalanced mass adjusting device in a vibration generator, in particular in a device for controlling the direction of travel of a soil compaction machine. This invention also relates to a process for controlling an unbalanced mass adjusting device in a vibration generator.

BACKGROUND OF THE INVENTION

Soil compaction machines usually have vibrating plates which move at a certain frequency to compact soil material by vertical impacts. The impacts are produced by vertically directed vibrations of the vibrating plate created by an opposing pair of unbalanced mass shafts. The unbalanced mass rotates in synchronization but in the opposite direction of rotation, resulting in a centrifugal force in one direction of vibration. By phase displacement of the unbalanced masses, it is thus possible to adjust a desired direction of vibration, which may deviate from the vertical direction of vibration, so that in addition to the vertical component of vibration, a horizontal component of vibration is also generated. The horizontal component of vibration produces a forward or reverse movement of the soil compaction machine.

The publication DE 101 21 383 C2, for example, discloses a control unit for an unbalanced mass adjusting device with a vibration generator of a soil compaction machine. An adjusting cylinder may be used here for adjusting phase angles of unbalanced masses in the vibration generator with the help of a reference piston which is connected to a switching valve. The switching valve serves to control an oil flow from a hydraulic oil source or an oil drain to an oil return flow and from the reference piston. The user of the soil compaction machine can adjust the switching valve electrically or mechanically between two positions, thereby permitting movement of the adjusting cylinder in both directions in order to select the forward or reverse movement of the soil compaction machine. One disadvantage of such units that control the direction of travel is that measured value pickups are required.

The publication DE 199 12 813 C1 also discloses a unit for controlling the direction of travel for a soil compaction machine. It includes a movable travel lever, the positions of which are detected by a sensor which then triggers a switching valve. The switching valve controls an adjusting cylinder in a vibration-generating device so that the cylinder is displaced between a starting position and an end position. Depending on the position of the adjusting cylinder, the soil compaction device travels forward or in reverse. With this soil compaction machine it is also possible to adjust only one forward or reverse movement, which is determined by the resulting centrifugal force in the end positions of the adjusting cylinder. However, it is not possible to adjust the speed of travel in a controlled manner.

SUMMARY OF THE INVENTION

The object of the present invention is to make available a control unit for an unbalanced mass adjusting device in a vibration generator whereby the speed of travel can be influenced in a controlled manner. Another object of the present invention is to provide a method for controlling an unbalanced mass adjusting device of a vibration generator.

This object is achieved according to this device by a control unit for triggering the control valve according to a pulse width modulation signal to adjust the relative position of the unbalanced masses as a function of the pulse duty factor of the pulse width signal.

This object is achieved in this process by the fact that the relative positions of contrarotating unbalanced masses in the vibration generator are selected to adjust the vibration characteristic of the vibration generator by controlling the relative position of the unbalanced masses as a function of a pulse width modulation signal.

Advantageous embodiments of this invention are characterized in the dependent claims.

According to a first aspect of the present invention, a control unit is provided for an unbalanced mass adjusting device in a vibration generator. It has an adjusting cylinder which is hydraulically adjustable to adjust a relative position of contrarotating unbalanced masses in the vibration generator. A control valve is provided to adjust the adjusting cylinders so that the vibration characteristic of the vibration generator, in particular the direction of vibration of the vibration generator, is adjusted. A control unit is provided for triggering the control valve according to a pulse width modulation signal to adjust the relative position of the unbalanced masses as a function of the pulse duty factor of the pulse width modulation signal.

In this way, this achieves the result that the position of the adjusting cylinder of the vibration generator is adjusted in a controlled manner with the help of a controlled valve so that a certain desired vibration behavior of the vibration generator is achieved. The control valve is suitable for moving the adjusting cylinder in only one direction up to the respective end position, depending on the valve setting, due to the inflow and outflow of hydraulic fluid with a certain fluid flow, so a continuous adjustment of the adjusting cylinder is impossible with the help of the control valve. According to this invention, the control valve is triggered according to a pulse width modulation signal. A pulse width modulation signal is periodic and has two states within the period, namely a first state and a second state. The pulse duty factor is the ratio of the period of time during which the first state is assumed to the period. The pulse width modulation signal causes the adjusting cylinder to move during the first state in the direction of the first end position and during the second state in the direction of the second end position when triggering the control valve. The adjusting cylinder does not assume the respective end position directly but instead proceeds toward it over a certain period of time. If the state of the control valve changes according to a change of state of the pulse width modulation signal, then the adjusting cylinder also changes the direction of proceeding if the previously desired end position has not yet been reached. The direction of vibration of the vibration generator is established at an average value due to the constant change in the position of the adjusting cylinder.

Due to the switching of the control valve according to the pulse width modulation signal, it is possible to move the adjusting cylinder back and forth between two positions during the period. Therefore, the traveling speed of the compaction machine is obtained as the average of the traveling speeds resulting from the respective positions of the adjusting cylinder. Thus the traveling speed can be reduced in comparison with the traveling speed which corresponds to the end positions of the adjusting cylinder by reducing the effective angle of slope of the vibration direction with respect to the vertical direction of vibration.

The control unit can be connected to the control valve to control the adjusting cylinder according to a first level of the pulse width modulation signal such that the relative position of the unbalanced masses is adjusted in the direction of a first defined end position and the adjusting cylinder is triggered according to a second level of the pulse width modulation signal so that the relative positions of the unbalanced masses are adjusted in the direction of a second defined end position.

In particular it is possible to provide for the pulse width modulation signal to assume the first level for a first period of time during a period and to assume the second level for a second period of time. The sum of the first and second periods corresponds to the period of the pulse width modulation signal.

In an expedient embodiment, the control valve is designed with respect to the adjusting cylinder so that the adjusting cylinder can be moved completely between the first and second end positions at a pulse duty factor of the pulse width modulation signal of 50% and a predetermined period.

According to another embodiment, the control unit may be connected to an input unit to adjust the pulse width modulation signal as a function of a user input. The input unit is preferably connected to the vibration generator in such a way that a user can control the driving speed via the input unit during ongoing operation.

According to another aspect of the present invention, a soil compaction machine with an inventive control is provided, said control having a vibrating plate which is connected to unbalanced masses so that a forward or reverse motion is achieved, depending on the relative positions of the unbalanced masses.

According to another aspect of the present invention, a method of controlling an unbalanced mass adjusting device in a vibration generator is provided. The relative positions of contrarotating unbalanced masses in the vibration generator are selected so that the vibration characteristic of the vibration generator can be adjusted. The relative positions of the unbalanced masses are controlled as a function of a pulse width modulation signal. In particular the relative positions of the unbalanced masses are controlled as a function of a pulse width modulation signal. In particular the relative position of the unbalanced masses are set as a function of the pulse duty factor of the pulse width modulation signal.

It is possible for the relative positions of the unbalanced masses to be adjusted in the direction of a first defined end position at a first level of the pulse width modulation signal and for the relative positions of the unbalanced masses to be adjusted in the direction of a second defined end position at a second level of the pulse width modulation signal.

According to an expedient embodiment, the relative positions of the unbalanced masses may change completely from the first end position to the second end position at a pulse duty factor of 50% and at a predetermined period.

The relative position can change at least partially in the direction of one of the defined end positions when there is a pulse duty factor that differs from 50% and at the predetermined period, without reaching this end position during the first period of time for the first level and/or the second period of time for the second level. As a result, the relative position of the unbalanced mass during the period moves from one stop position in the direction of another stop position and after the respective first or second period has elapsed it moves back again from the intermediate position reached by that point in time back to the stop position. Therefore the adjusting cylinder is not in the stop position during the entire period of time so that on the average the angle of slope of the direction of vibration is reduced in the direction of the vertical direction of vibration.

BRIEF DESCRIPTION OF THE DRAWINGS

Preferred embodiments of this invention are explained in greater detail below on the basis of the accompanying drawings, which shows schematically.

DETAILED DESCRIPTION

Figure 1:
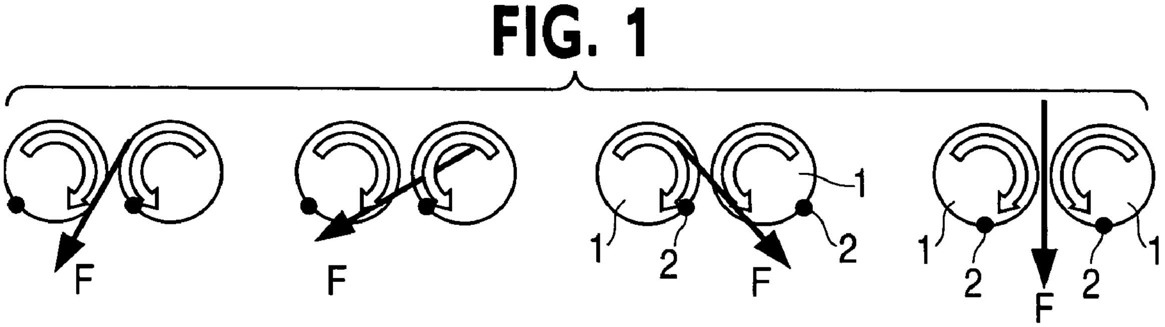
FIG. 1 shows an illustration of the control of the direction of travel of an unbalanced mass adjusting device.

FIG. 1 shows schematically how a forward and reverse movement of a vibration generator, in particular a soil compaction machine with a vibrating plate, is generated. The vibrating plate is set in vibration by rotating unbalanced masses 2 which have mutually opposite directions of rotation. Depending on the phase angle of the unbalanced masses 2 in relation to one another, a resulting centrifugal force F of the unbalanced masses 2 is created. In the case of standing vibration, the resultant centrifugal force F acts in the vertical direction. With forward and reverse movement of the vibration generator, the resultant centrifugal force F is inclined toward the vertical at an angle of inclination so that in addition to the vertical vibration component of the resultant centrifugal force F, a horizontal vibration component is also in effect, resulting in a traveling movement of the vibration generator.

According to FIG. 1, two unbalanced mass shafts 1 are moving in opposite directions with the unbalanced masses 2 depicted as a point. The unbalanced masses 2 are arranged with an offset angle on the unbalanced mass shafts 1 to create phase-shifted centrifugal forces, so that depending on the relative position of the unbalanced masses in relation to one another, the resultant centrifugal force F is inclined more or less with respect to the vertical.

FIG. 1 shows the resultant centrifugal forces at various relative positions of the unbalanced masses 2. It can be seen here that the resultant centrifugal force may be inclined to the vertical depending on the relative positions of the unbalanced masses 2, so that a movement in the direction of the horizontal component of the resultant centrifugal force is induced.

The unbalanced mass shafts 1 are interconnected in a rotationally fixed manner by a form-fitting force transmission means so that the directions of rotation and the phase allocations are ensured. With the help of an adjusting cylinder, the positions of the unbalanced masses 2 on the unbalanced mass shafts 1 in relation to one another can be adjusted, as described in detail in German Patent DE 199 12 813 C1, for example.

The speed of travel of the vibration generator cannot usually be adjusted by the user in a controlled manner because the piston position cannot be ascertained. The direction of travel of soil compaction machines is determined by the degree of inclination of the resultant centrifugal force of the unbalanced mass shafts 1, so the vertical amplitude of the vibration is reduced with an increase in the speed of travel. On a very soft substrate, this may result in the remaining vertical amplitude no longer being sufficient to lift the baseplate in the case of a maximum inclination of the resultant centrifugal force. However, if the vibrating plate cannot be lifted, no traveling movement is possible either. If, in this situation, the angle of inclination of the resulting centrifugal force could be reduced in the direction of the vertical amplitude, a traveling movement could again be achieved because the component of the vertical amplitude would be increased.

FIGS. 2 through 7 show schematically a control unit for a hydraulic adjusting cylinder 4 for adjusting the relative position of unbalanced masses 2 in a soil compaction machine at successive points in time t0 through t5. Depending on the adjustment of the piston 3, the machine moves forward or in reverse. For the sake of simplicity, the mechanism by which the adjusting cylinder 4 is connected to the unbalanced mass shafts 1 and the unbalanced masses 2 is not shown here. The adjusting cylinder 4 is situated in an open oil circulation with an adjustment pump 6 which supplies an oil volume flow and can be controlled via a control valve 5 which is designed here as a way valve. The adjustment pump 6 obtains the delivery stream 7 from a tank 8 to which the return flow 9 is returned. The volume flow is as uniform and constant as possible.

Figure 2:
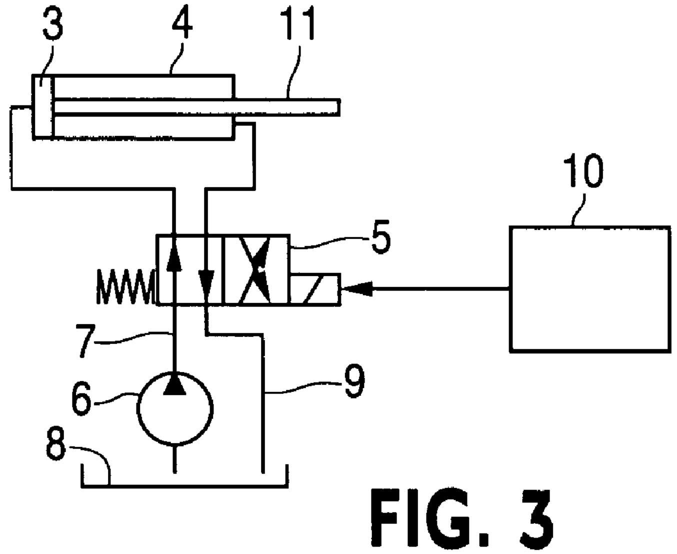
FIGS. 2 through 7 each show a schematic diagram of a control unit for a compaction machine with a vibrating plate.
Figure 3:
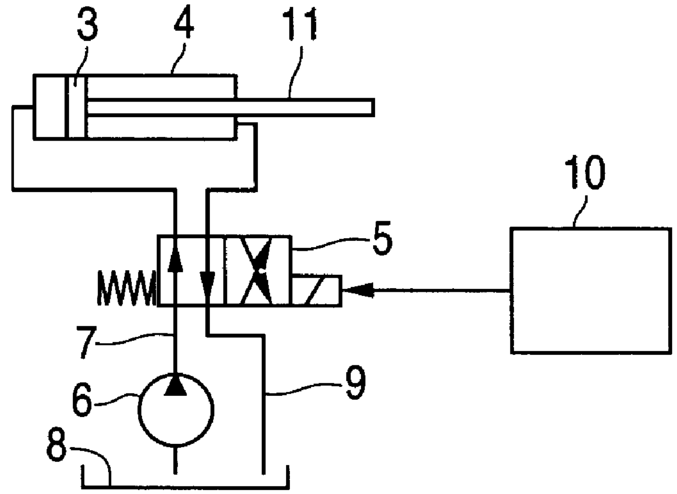
Figure 4:
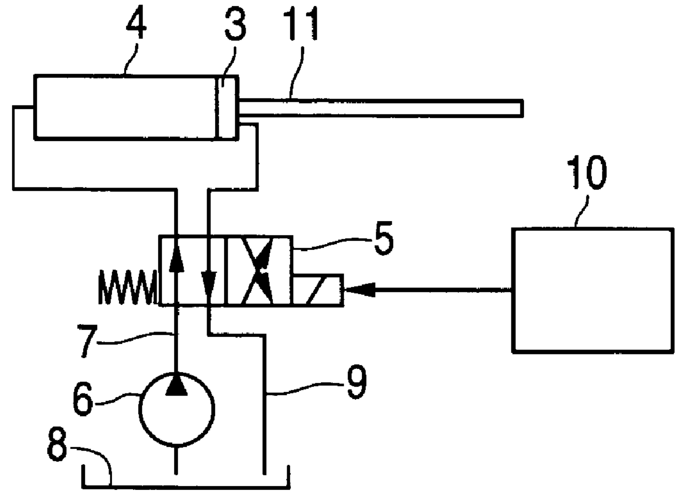
Figure 5:
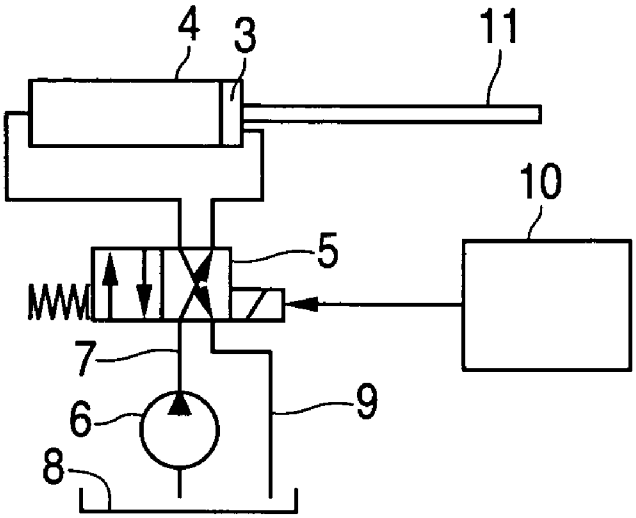
Figure 6:
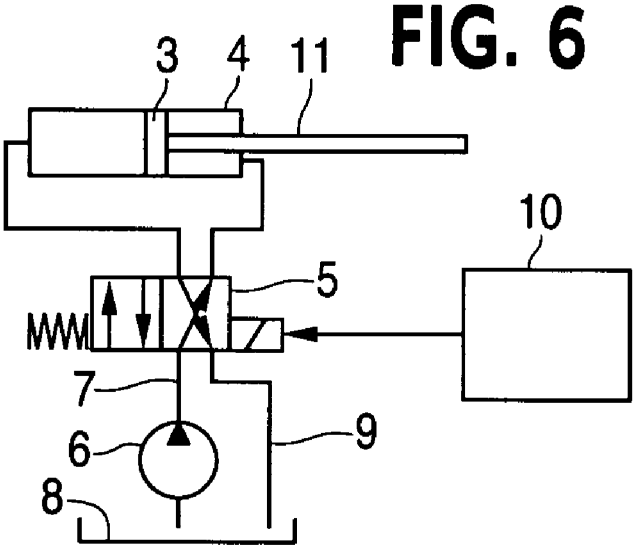

In a first switch position of the control valve 5 according to FIGS. 2 through 4, the piston 3 is acted upon by the delivery stream 7 on the side facing away from the piston rod 11. The side with the piston rod 11 is connected to the return flow 9. The piston 3 is thus displaced out of its first end stop position (starting position) according to FIG. 2 up to its second end stop according to FIG. 4. In a second switch position according to FIGS. 5 through 7, the connections are crossed so that the piston 3 moves from the second end position back into its starting position.

Figure 8:
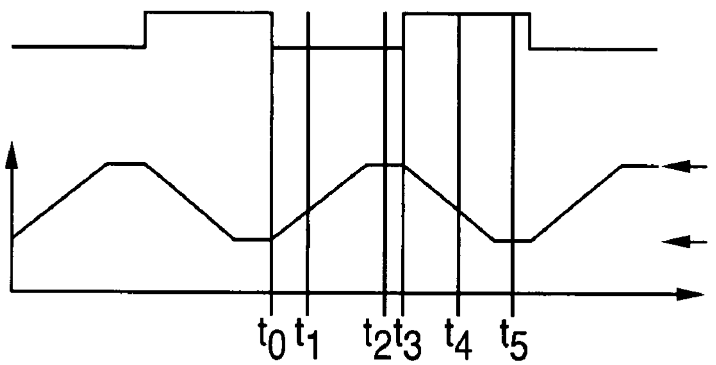
FIGS. 8 and 9 show characteristic curves of the piston movements of an adjusting cylinder as a function of a pulse width modulation signal.
Figure 9:
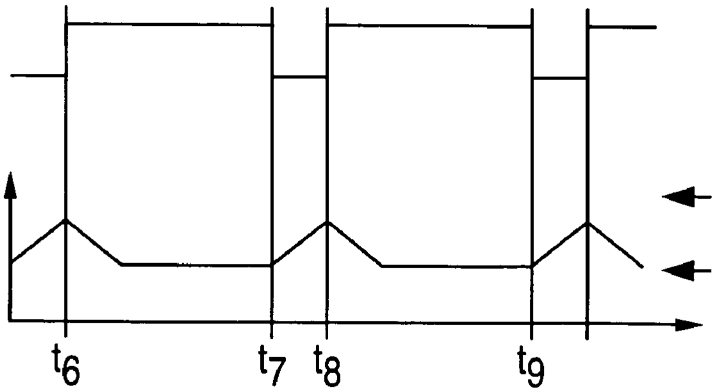

A first path-time diagram is shown in FIG. 8 for the piston positions illustrated in FIGS. 2 through 7. FIG. 8 shows the piston path as a function of a pulse width modulation signal (PWM signal) with a pulse/pause ratio of 50%. FIG. 9 shows a second path-time diagram for a pulse/pause ratio of 80%.

The control valve 5 is triggered by a control unit 10 with a control signal such that it is adjusted according to a first level of the control signal into the first switch position and according to a second level of the control signal into the second switch position.

The control unit 10 is connected to an input device so that an operator of the soil compaction machine can adjust the desired traveling movement essentially continuously or in several steps according to a preselected value.

The control unit 10 generates from the preset value a pulse width modulation signal which is made available to the control valve 5. The pulse width modulation signal is periodic and is at the first signal level during a first period of time and at the second signal level during a second period of time. The sum of the first and second periods of time corresponds to the period. The pulse duty factor gives the ratio between the duration of the first signal level and the period while the pulse/pause ratio gives the ratio of the first duration to the second duration.

The pulse width modulation signal serves to trigger the control valve 5 and thus move the piston of the adjusting cylinder 4 back and forth.

The period of the pulse width modulation signal is preferably selected so that at a pulse duty factor of 50%, the first signal level is sufficient to move the piston completely from the second end position into the first end position. For example, the period may be between 0.5 and 2 seconds, in particular 1 second. Other values for the period are also possible.

As shown in FIG. 8, the hydraulic system is designed so that the piston of the adjusting cylinder 4 is moved back and forth between the first and second end positions at a pulse duty factor (pulse/pause ratio) of 50%. This corresponds to the standing vibration because the horizontal components of the resultant centrifugal forces cancel one another on the average so the result is no traveling movement.

Figure 7:
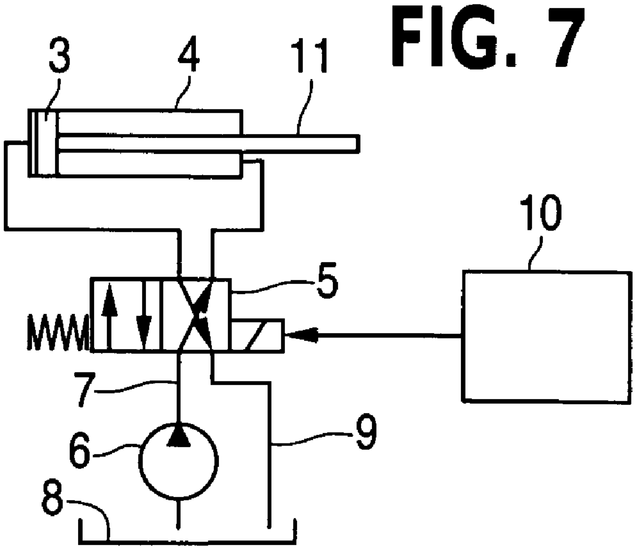

At time t0 a forward movement of the piston 3 out of the reverse starting position is started (FIG. 2). At time t1, the piston is in forward movement (FIG. 3). At time t2, the piston has reached its second end position (FIG. 4). At time t3, the control valve 5 switches (FIG. 5) and the piston 3 moves back at time t4 (FIG. 6) to the starting position at time t5 (FIG. 7).

If the pulse duty factor according to FIG. 9 is changed to approx. 80%, then the piston of the adjusting cylinder remains in the first end position for most of the time (80% of the period). For only 20% of the period, the piston moves in the direction of the second end position after time t7 and t9. However, it does not reach the end position, but instead the movement is reversed again at times t6 and t8 during the movement from the first end position to the second end position, and after that, the piston again goes back to the first end position. In the average over time, the piston is thus just before the first end position. Since only the average of the piston position over time is of interest for operation of the soil compaction machine, this type of control is sufficient for the traveling speed. No sensor or the like is necessary for controlling the piston position because the movement process of the piston is limited by the end positions and thus the adjusting cylinder is moved back to a defined position in each cycle.

The invention claimed is:

1. A control unit for an unbalanced mass adjusting device in a vibration generator, in particular in a soil compaction machine, having an adjusting cylinder which is hydraulically adjustable to adjust a relative position of contrarotating unbalanced masses in the vibration generator, a control valve for adjusting the adjusting cylinder so that the vibration characteristic of the vibration generator is adjusted, and a control unit for triggering the control valve according to a pulse width modulation signal to adjust the relative position of the unbalanced masses as a function of the pulse duty factor of the pulse width modulation signal, wherein the control unit is connected to the control valve to trigger the adjusting cylinder according to a first level of the pulse width modulation signal so that the relative position of the unbalanced masses is adjusted in the direction of a first defined position and to trigger the adjusting cylinder according to a second level of the pulse width modulation signal so that the relative position of the unbalanced masses is adjusted in the direction of a second defined position.

2. A control unit according to claim 1, wherein the pulse width modulation signal assumes the first level for a first duration during a period and assumes the second level for a second duration.

3. A control unit according to claim 2, wherein the hydraulic system is designed with respect to the adjusting cylinder so that the adjusting cylinder is completely movable between the first position and the second position at a pulse duty factor of 50% and with a predetermined period.

4. A control unit according to claim 2, wherein the hydraulic system is designed with respect to the adjusting cylinder so that the adjusting cylinder can be moved at least partially in the direction of one of the defined positions at a pulse duty factor different from 50% and with a predetermined period.

5. A control unit according to claim 1, wherein the control unit is designed so that the pulse width modulation signal can be adjusted as a function of a user input.

6. A soil compaction machine having a control unit according to claim 1, whereby a vibrating plate is provided and is connected to unbalanced masses to cause a forward or reverse movement as a function of the relative position of the unbalanced masses.

7. A method for controlling an unbalanced mass adjusting device in a vibration generator, in particular in a soil compaction machine, whereby the relative position of contrarotating unbalanced masses in the vibration generator is selected to adjust the vibration behavior of the vibration generator, wherein the relative position of the unbalanced masses is controlled as a function of a pulse width modulation signal, wherein the relative position of the unbalanced masses is adjusted as a function of the pulse duty factor of the pulse width modulation signal, wherein the relative position of the unbalanced masses is adjusted in the direction of a first defined position at a first level of the pulse width modulation signal, and the relative position of the unbalanced masses is adjusted in the direction of a second defined position at a second level of the pulse width modulation signal.

8. A method according to claim 7, wherein the pulse width modulation signal assumes the first level for a first duration within a period and assumes the second level for a second duration.

9. A method according to claim 8, wherein the relative position of the unbalanced masses changes completely from the first position to the second position at a pulse duty factor of 50% and at a predetermined period.

10. A method according to claim 8, wherein at a pulse duty factor different from 50% and at a predetermined period, the relative position changes at least partially in the direction of one of the defined positions.

* * * * *